United States Patent Office 3,547,698
Patented Dec. 15, 1970

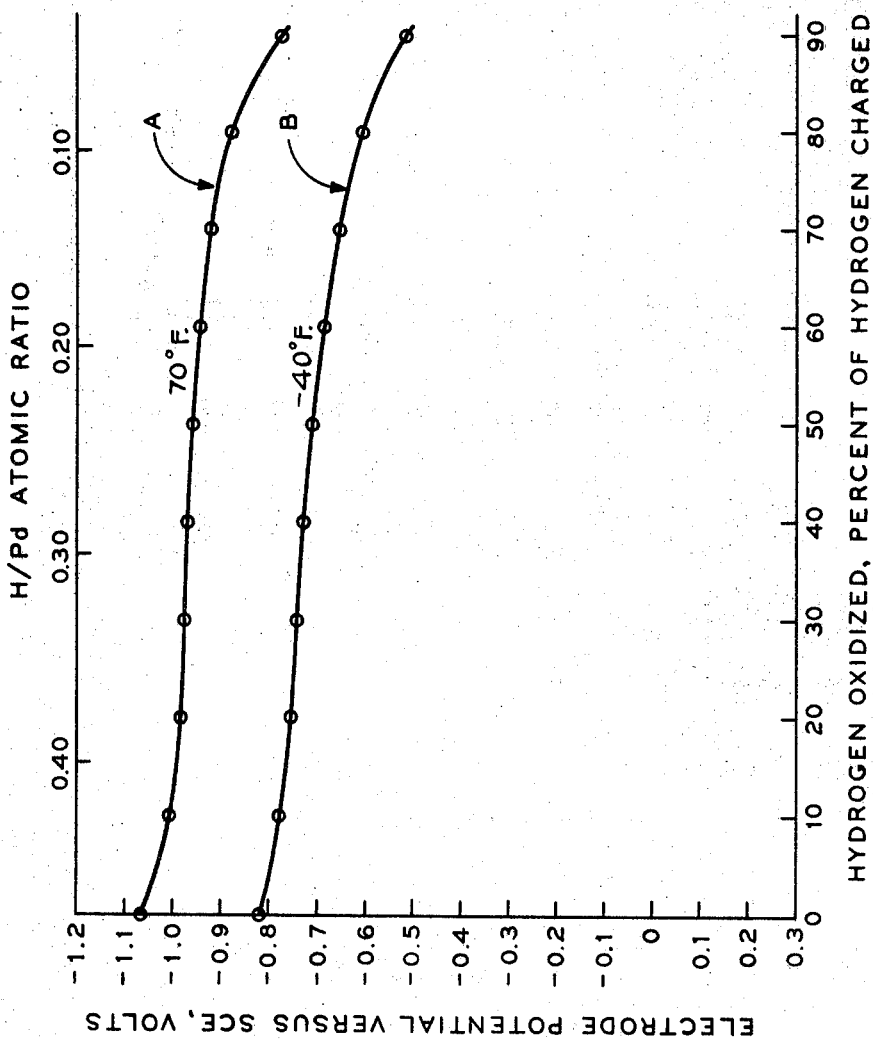

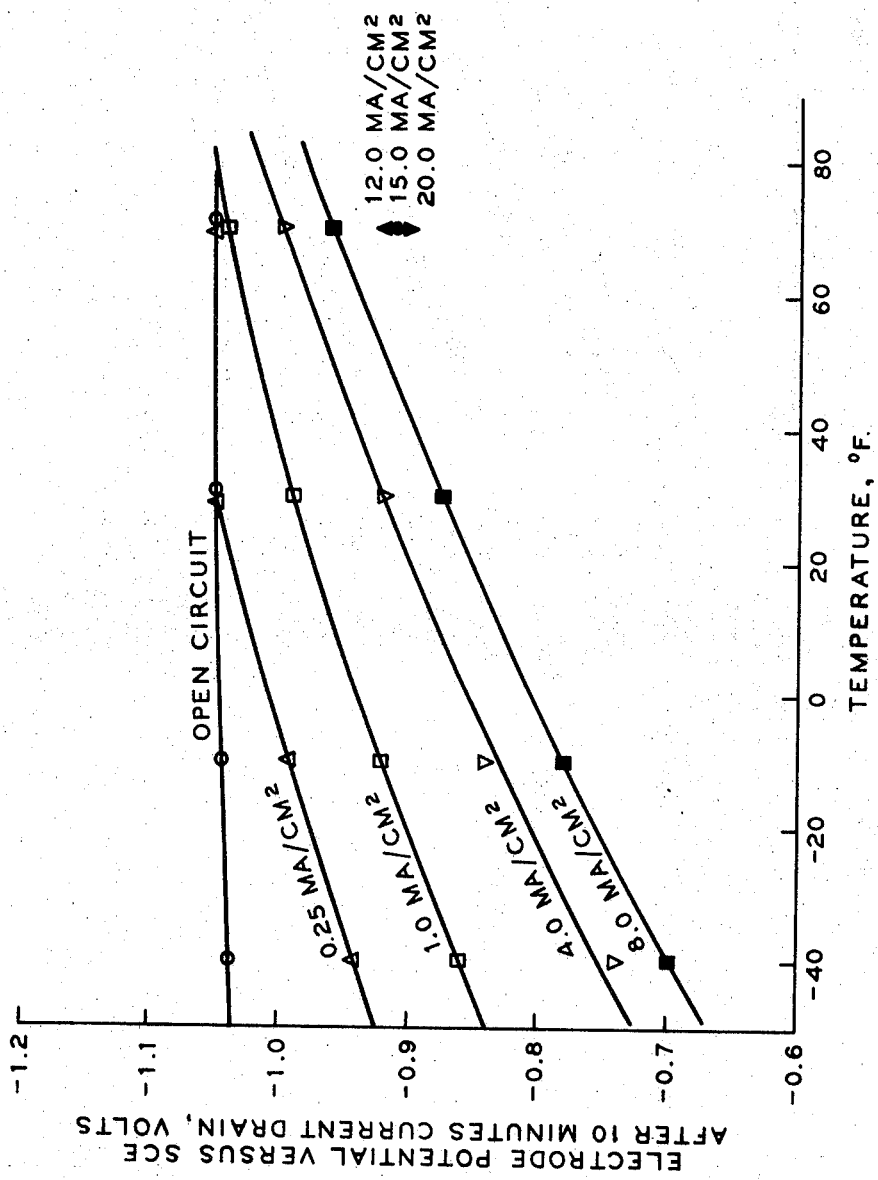

3,547,698
ELECTRICAL POWER SOURCE
Maurice J. Schlatter, Berkeley, Calif., assignor to Chevron Research Company, San Francisco, Calif., a corporation of Delaware
Filed Sept. 15, 1966, Ser. No. 579,674
Int. Cl. H01m 35/02
U.S. Cl. 136—6                                                      1 Claim

ABSTRACT OF THE DISCLOSURE

Constant potential batteries are provided using a hydrogen-palladium anode for hydrogen storage, having a hydrogen-palladium atomic ratio of about 0.6.

---

This invention concerns novel electrical power sources having stored hydrogen anodes.

The requirement that a battery operate in a useful way from −40° F. to 140° F. over an extended period of time is difficult to satisfy. In general, batteries which will operate successfully at −40° F. have high self-discharge rates at higher temperatures, which prevent their use over long periods of time. While many cathodic materials are usable in this temperature range, e.g., mercuric oxide and other metal oxides, there are few anodic materials which are suitable.

In addition to operating efficiently over a wide temperature range, there are many other characteristics which are desirable in a battery. For some applications, it is desirable that the battery be able to withstand mechanical shock, high acceleration and deceleration forces and high spin velocities. Also, when the battery is used with miniaturized electronic equipment, the battery should provide stable operation at low current drain.

It has now been found that hydrogen dissolved in palladium is an active anode at temperatures as low as −40° F. and that the hydrogen-palladium anode will give relatively constant potenials with hydrogen-palladium atomic ratios of 0.03 to 0.60 over a wide temperature range. At the upper H/Pd atomic ratio limit, the anode is completely charged, while at the lower limit, the anode is completely discharged, that is, as far as having the cell provide a relatively constant voltage source.

Performance of the "stored hydrogen" palladium electrode is demonstrated in FIG. 1 by a graph of the discharge potential curve at two different temperatures and at constant discharge current density.

FIG. 2 indicates the effect of temperature on performance by drawing a specified current for 10 minutes at a particular temperature and then determining the potential of the electrode versus a standard Calomel electrode.

In one application of the present invention, miniaturized batteries can be made using a plurality of thin nickel or silver foils. Palladium is deposited on one side of all but one foil, which serves as a cathode at one end cell of the battery. Insulating washers seal the edges of the cells, formed by stacking the palladized foils. A suitable electrolyte is introduced in the spaces between the foils. The battery is activated electrochemically by passing a current through it. The nickel or silver is oxidized into nickel or silver oxides, which function as cathodes, while hydrogen produced at the palladium surface is absorbed giving the "stored hydrogen electrode."

Many variations of the above design are possible. For example, high surface area silver or nickel may be deposited on the surface of a foil of the particular metal and partially pre-oxidized before assembly of the battery. Other metal oxides, such as mercuric oxide, may be used as cathodic materials and the cathodes produced by conventional techniques. Not only those metal or metal oxides disclosed above may be used, but other metals such as stainless steel, tantalum and titanium may also be employed as the electrically conducting barrier between cells. Nonconductors (inert organic plastic materials) can be used with external electrical connections in any desired series or series-parallel arrangement to give the desired output characteristics.

Various electrodes may be used, both acidic and basic. Preferably, alkali metal hydroxides, in from about 2 to 10 molar, more preferred from about 5 to 8 molar, particularly potassium hydroxide, can be employed. Alternatively, from about 0.5 molar to 6 molar sulfuric acid may be employed. These electrolytes may be absorbed in suitable porous media, such as are used in conventional batteries, providing the desired physical properties. Separator membranes may be included to reduce self-discharge process.

As already indicated, the palladium used for hydrogen storage may be present as a fine precipitated layer. Alternatively, the palladium may be present as a wire, a palladized palladium wire, partially alloyed with silver (less than 25 weight percent silver) or in any convenient form which permits facile migration of hydrogen to the palladium surface.

In various modifications of this invention, the hydrogen may be introduced into the palladium by different methods: adsorption from hydrogen gas under pressure; hydrogen saturation of the electrolyte; and, as already mentioned, use of the palladium as a cathode in an electrolysis cell. When using the electrolysis method, current density should generally be less than 80 ma./cm.$^2$, and usually in the range of about 40 to 60 ma./cm.$^2$. By using the current densities in the indicated range, the greatest recovery of the hydrogen charge is achieved.

In order to demonstrate the use of hydrogen stored palladium anodes, electrochemical discharge was carried out on palladized palladium wire "hydrogen storage electrodes" at controlled rates at different temperatures. The apparatus used to establish this consisted of a conventional pyrex H-cell. Vertical compartments for the test electrodes and a platinum gauze counter-electrode were connected by a horizontal tube. A fritted glass disk in the horizontal tube reduced diffusion between the electrode compartments. The reference electrode was a capillary electrolyte bridge terminating near the test electrode, which was kept at room temperature. Test electrode potentials were measured relative to the reference electrode. Air was excluded with suitable caps and by bubbling purified argon through or over the surface of the electrolyte in the anode compartment. Temperatures were controlled by immersing the H-cell in a thermostat.

Test electrodes were prepared by spot welding a palladium wire coil to a platinum wire, which was in turn fused in glass tubing. The wires were cleaned with hot nitric acid, etched lightly with aquaregia, rinsed thoroughly with redistilled water and then plated. For the palladization, the electrodes were immersed in a stirred solution containing 1 weight percent palladium chloride in 2 N hydrochloric acid. The electrodes were plated for 30 seconds at a current density of 10 ma./cm.$^2$.

For a few of the experiments, a thin layer of palladium on a conducting support was required. These electrodes were prepared in the same manner as the palladized palladium wire electrodes, using platinum wire as the support material. In a typical preparation, 2 mg. of palladium was deposited on a 0.405 mm. diameter platinum wire having a 1 sq. centimeter surface area.

In determining the discharge curves, the usual procedure was to deoxygenate the electrolyte by bubbling purified argon through it for several hours. The electrolyte was preelectrolyzed to remove trace impurities. The test electrode was then cathodized at constant current for a measured length of time. From the number of coulombs passed, the hydrogen content was calculated. In these quantitative experiments, the current densities employed were less than 10 ma./cm.$^2$ to insure complete absorption of the hydrogen produced. Other experiments showed that several times this current density can be used in practical applications without appreciable hydrogen loss. After charging the electrode with hydrogen, the polarity was reversed and current was drawn from the test electrode at constant current. From the coulombs drawn, the hydrogen oxidized was calculated. Discharge curves were constructed using the data obtained and the observed electrode potentials of the test electrode versus the standard Calomel electrode (SCE).

FIG. 1 shows typical discharge curves for palladized platinum hydrogen storage electrodes at 70° F. (Curve A) and —40° F. (Curve B). As already indicated, the palladized platinum wire electrode was a wire 0.405 mm. diameter coated with 2.05 mg. of palladium per sq. centimeter. The electrode was charged with hydrogen using 1.485 coulombs at 5.6 ma./cm.$^2$ rate. Seven normal potassium hydroxide was used as the electrolyte. The discharge current density used for A was 2.25 ma./cm.$^2$, for B 2.1 ma./cm.$^2$. The results demonstrate that at the two different temperatures, only a slight change occurs in the electrode potential versus a standard Calomel electrode over a range of consumption of 90% of the hydrogen charged.

FIG. 2 shows the effect of temperature on the polarization of palladized palladium hydrogen storage electrodes at different current densities; the preparation of the electrode has been previously described. The electrolyte used was 7 N KOH and the hydrogen-palladium atom ratio was 0.36. At the low temperature extreme of the range studied, sustained operation cannot be maintained at current densities of 1 ma./cm.$^2$, but can be maintained at lower current densities. However, at temperatures not much above —40° F., sustained operation can be maintained for long periods of time.

It is evident from the reported results that by using a hydrogen stored palladium electrode, electrical sources can be provided which are stable over long periods of time, providing sustained voltage, do not self-discharge at relatively high temperatures, will provide stable currents at relatively low temperatures, and are readily activated to provide the desired power.

As will be evident to those skilled in the art, various modifications on this invention can be made or followed, in the light of the foregoing disclosure and discussion, without departing from the spirit or scope of the disclosure or from the scope of the following claim.

I claim:
1. A battery comprising a cathode of silver oxide or nickel oxide and a hydrogen-dissolved-in-palladium anode, having a hydrogen-palladium atomic ratio of about 0.60.

References Cited

UNITED STATES PATENTS

| | | | |
|---|---|---|---|
| 3,382,106 | 5/1968 | Jung et al. | 136—120FC |
| 2,104,973 | 1/1938 | Dassler | 136—120 |
| 3,117,032 | 1/1964 | Danzer | 136—100 |
| 3,148,031 | 9/1964 | Vahldieck | 136—120FC |
| 3,311,508 | 3/1967 | Biddick et al. | 136—120FC |
| 3,337,368 | 8/1967 | Oswim | 136—120FC |

FOREIGN PATENTS

| | | | |
|---|---|---|---|
| 1,156,768 | 11/1963 | Germany | 136—120FC |

WINSTON A. DOUGLAS, Primary Examiner

C. F. LEFEVOUR, Assistant Examiner

U.S. Cl. X.R.

136—83